Feb. 16, 1932.  J. LEDWINKA  1,844,965
VEHICLE BODY SIDE CONSTRUCTION
Original Filed Jan. 9, 1926
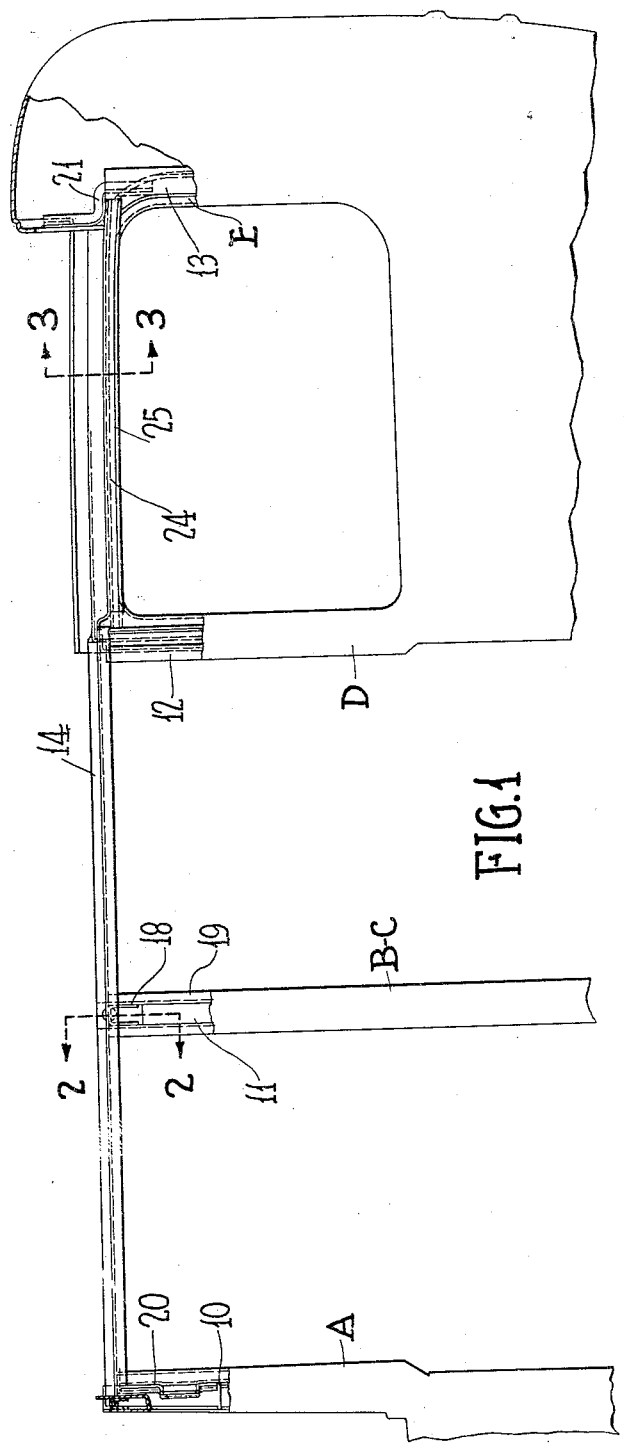
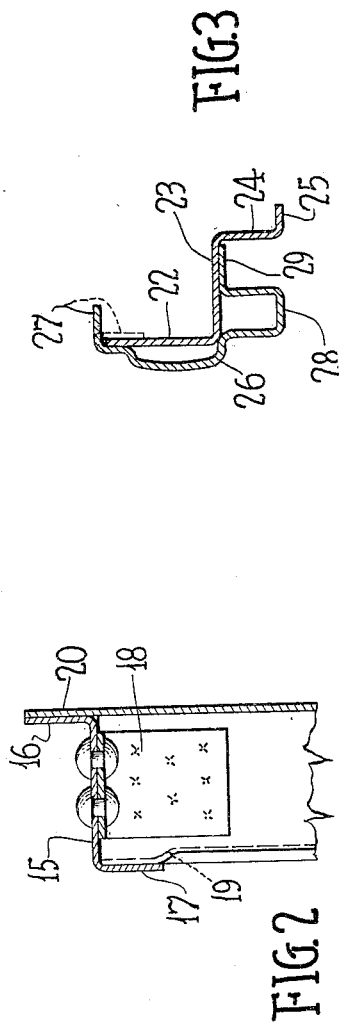
INVENTOR.
JOSEPH LEDWINKA
BY
ATTORNEY.

Patented Feb. 16, 1932

1,844,965

UNITED STATES PATENT OFFICE

JOSEPH LEDWINKA, OF PHILADELPHIA, PENNSYLVANIA

VEHICLE BODY SIDE CONSTRUCTION

Original application filed January 9, 1926, Serial No. 80,166, and in Canada January 7, 1927. Divided and this application filed March 25, 1931. Serial No. 525,055.

This invention relates to automobile bodies of closed design, known as the sedan type, and relates particularly to structures of this type which are built up of sheet steel stamped or otherwise formed into the desired form or contour and rigidly secured together.

This application is a division of application Serial No. 80,166, filed Jan. 9, 1926.

The object of the invention is to provide a closed automobile body which is at once simple, strong and rugged and which can be easily and economically manufactured.

A still further object is the provision of a side header of such cross section as permits the application of the roof unit with greater ease and facility than has heretofore been possible.

Other objects of the invention will appear more fully hereinafter.

The invention consists substantially in the construction, combination, location and relative arrangement of parts all as will be more fully hereinafter set forth as shown in the accompanying drawings and finally pointed out in the appended claims.

Referring to the accompanying drawings,

Figure 1 is a fragmentary side elevational view, showing the upper portion of the body in central longitudinal section.

Figures 2 and 3 are detail sectional views taken on the corresponding lines of Figure 1.

The same part is designated by the same reference numeral wherever it occurs throughout the several views.

In the manufacture of automobile bodies it is desirable to secure strength and rigidity in the completed structure, simplicity in the parts composing the structure and speed in the assembling and joining of the parts together in order to secure economy. In attaining this result it is equally desirable to secure ruggedness in the completed structure and the production of a body to efficiently withstand the shocks and vibrations in use.

In the accomplishment of these objects and purposes I propose to construct the automobile body out of sheet steel stampings which are pressed or stamped into the desired shape or contour and are assembled and secured together to produce a single integral homogeneous structure.

In the drawings, the front post is represented by numeral 10, the intermediate or B and C post by 11, the rearmost door or D post by 12, the rearmost or E post at the rear of the rear quarter window opening by 13 and the top rail connecting the tops of these post members, by 14.

The posts are generally of inwardly presenting channel form except the E-post which is a rearwardly presenting channel, and the top rail is according to the present invention continuous from the A to the E posts. The construction of the posts is, however, immaterial as respects this invention except as their form and the form of the top rail facilitates its joinder to the tops of the posts.

The side top rail of my invention forms the principal frame element of the body extending above the doors and window openings and is given a form which makes for extreme simplicity and yet highly adaptable to coact with adjoining elements.

It is mounted upon and secured in an intermediate portion thereof to the top of the B and C post 11, and is of simple Z section throughout that portion extending forwardly of the D post and of double angle cross section throughout that portion which extends rearwardly of the D post as clearly appears in Figs. 2 and 3. Ordinarily in the practice of my invention, the top rail is first joined to the intermediate B and C post 11 to the bottom of which the side sill is joined, to form an intermediate side unit, which is joined through the ends of the sill and top rail to a front unit carrying A-posts 10 and a tonneau unit carrying the D and E posts 12 and 13.

The simple Z section of the rail 14 between the A and D posts enables the joinder of the posts very simply and securely thereto as indicated in Fig. 2. The web 15 of the Z is arranged horizontally and is of substantially a width equal to the thickness of the body wall. The rail thus serves also as the top jamb face of the door openings. The outer arm 16 of the Z extends upwardly to provide with the web an angular seat for the side of the roof and the inner arm 17 extends downwardly and provides a door stop flange. The channel section posts of the depth of the body wall are readily and strongly secured to this simple Z section rail. In Figs. 1 and 2 is illustrated the manner of securing the B and C post. The side walls of the post abut the web 15 of the rail and are rigidly secured thereto by the U-shaped bracket 18 having its side walls secured to the side walls of the post and its bottom wall secured as by rivets to the web of the rail. The post is further secured to the rail by having its lateral flanges 19 which overlap the downwardly extending arm 17 welded thereto, and by having its base wall 20 extended upwardly to overlap and be secured to the upwardly extending arm 16.

The top rail is joined at the front to the A-post 10 by suitable means, including an angle bracket 20. The top rail overlies the D-post 12 in a manner similar to its relation to the B and C post 11 and may be similarly secured thereto.

Just in rear of the post 12, the top rail is offset downwardly to bring it to the level of the top of the rear quarter window, which is somewhat below the level of the door and is there given the double angle form shown in Fig. 3. At its extreme rear end it is secured to the E-post 13 as by a bracket 21. The upper angular portion formed by the vertical arm 22 and the horizontal arm 23, serves like the angular formation formed by the web 15 and outer arm 16 of the simple Z-section portion of the rail to receive the edge frame of the roof. The lower and smaller angular portion formed by the vertical arm 24 and narrow horizontal arm 25 serves to seat a trim strip.

The vertical arm 24 of this portion of the rail also forms the inner side wall of the glass run channel at the top of the rear quarter window opening.

The outer side wall and bottom of this glass run channel are formed by the panel strip 26 seated at the top against the upper margin of the arm 22 and provided at its top edge with an inwardly extending flange, which is adapted to be crimped over the top margin of the arm 22 of the rail, as indicated in dotted lines in Fig. 3. The lower edge of the panel is beaded downwardly at 28 and formed with an inwardly extending edge flange 29 secured to the horizontal arm 23 of the top rail.

What I claim is:

1. In a pressed metal automobile body construction, a longitudinally extending side top rail having a cross section of substantially Z section, the outer arm of the Z extending upwardly and the inner arm extending downwardly and the web of the Z being of a depth substantially equal to the thickness of the body wall.

2. In a pressed metal automobile body construction a side top rail extending from the front post of the body to the rear post thereof, said top rail being intermediately supported at the top of the rear door post, the portion of the top rail extending forwardly of the door post being of substantially simple Z section and the portion thereof extending rearwardly of the rear door post being of substantially double angle section.

3. In a pressed metal automobile body construction, a side top rail supported at the top of the rear door rear post and having portions extending forwardly and rearwardly of said door post, the portion of said top rail which extends rearwardly of said door post being of inwardly and upwardly double angle formation, said angles constituting seats for the reception of a roof unit and upholstery tacking strips respectively.

4. In a vehicle body construction, a pressed metal top rail extending over the rear quarter window opening and having a main transversely extending web portion, an upwardly extending flange at the outer edge of said web portion, and a downwardly extending flange at the inner edge of said web portion forming a side of a window panel receiving channel and a panel strip applied to the outer side of said rail and formed to provide the outside wall and bottom of said window panel receiving channel.

5. In a vehicle body, a top rail stamping extending from the front post to the rear edge of a rear quarter window, said rail having its rear portion over the window opening downwardly offset with respect to its forward portion.

In testimony whereof I hereunto affix my signature.

JOSEPH LEDWINKA.